United States Patent
Conaway

(10) Patent No.: US 11,208,238 B2
(45) Date of Patent: Dec. 28, 2021

(54) USER-FRIENDLY TAMPER-RESISTANT/TAMPER-EVIDENT CONTAINER-SEAL SYSTEM FOR CONTAINERS OF CONSUMER GOODS AND METHODS OF USE

(71) Applicant: SealTech LLC, Indian Hills, CO (US)

(72) Inventor: Brian Jay Conaway, Indian Hills, CO (US)

(73) Assignee: SealTech LLC, Indian Hills, CO (US)

( * ) Notice: Subject to any disclaimer, the term of this patent is extended or adjusted under 35 U.S.C. 154(b) by 0 days.

(21) Appl. No.: 17/285,069

(22) PCT Filed: Feb. 28, 2020

(86) PCT No.: PCT/US2020/020480
§ 371 (c)(1),
(2) Date: Apr. 13, 2021

(87) PCT Pub. No.: WO2021/029911
PCT Pub. Date: Feb. 18, 2021

(65) Prior Publication Data
US 2021/0316906 A1    Oct. 14, 2021

Related U.S. Application Data

(60) Provisional application No. 62/886,267, filed on Aug. 13, 2019.

(51) Int. Cl.
*B65D 41/04* (2006.01)
*B32B 7/06* (2019.01)
(Continued)

(52) U.S. Cl.
CPC .............. *B65D 41/045* (2013.01); *B32B 7/06* (2013.01); *B32B 7/12* (2013.01); *B32B 27/08* (2013.01);
(Continued)

(58) Field of Classification Search
CPC ...... B65D 41/045; B65D 51/20; B65D 53/04; B65D 53/08; B65D 65/40; B65D 77/2024;
(Continued)

(56) References Cited

U.S. PATENT DOCUMENTS 4,020,842 A * 5/1977 Richman ................. A61F 13/58
604/390
4,097,627 A * 6/1978 Nemeth ................... A61F 13/58
428/40.1

(Continued)

FOREIGN PATENT DOCUMENTS

JP          2016074439          5/2012

OTHER PUBLICATIONS

International Search Report for PCT/US2020/020480 from KIPO International Searching Authority, dated Jun. 26, 2020 (3 pages).
(Continued)

*Primary Examiner* — Chun Hoi Cheung
*Assistant Examiner* — Brijesh V. Patel
(74) *Attorney, Agent, or Firm* — Terrence M. Wyles, Esq.; Startup IP Law, LLC

(57) ABSTRACT

The inventive disclosures described herein pertain to an improved tamper-resistant/tamper-evident (TE) seal for containers of consumer/commercial product-containment vessels (such as, for example, prescription bottles, condiment bottles, etc.) that enables a user, and in particular older persons, to better grip and/or exert leverage to more-easily and reliably open such containers. In one embodiment of the improved TE seal, a typical prior-art seal configuration that features an inner seal with a small overlapping flexible pull-tab layer is improved by affixing the pull-tab to another substantially rigid upper layer such that a user can insert the pull-tab member between two of the user's fingers wherein
(Continued)

US 11,208,238 B2

Page 2 the two user fingers are also disposed between the inner seal and the substantially rigid upper layer such that a user can more easily exert leverage/force to open the container that employs the tamper-resistant seal. This configuration is generally referred to as a "T-tab" configuration.

35 Claims, 5 Drawing Sheets

(51) Int. Cl.
  *B32B 7/12*   (2006.01)
  *B32B 27/08*  (2006.01)
  *B32B 27/36*  (2006.01)

(52) U.S. Cl.
  CPC ...... *B32B 27/36* (2013.01); *B32B 2307/5825* (2013.01); *B32B 2307/748* (2013.01); *B32B 2435/02* (2013.01); *B65D 2251/0096* (2013.01)

(58) Field of Classification Search
  CPC ........ B65D 77/2032; B65D 2251/0096; B65D 2251/0093; B65D 2251/0015; B65D 2577/205; B65D 2577/2058; B65D 2401/00; B65D 2401/15; B65D 2543/00425; B65D 2543/00833; B32B 7/02; B32B 7/04–06; B32B 7/12; B32B 27/08; B32B 27/32; B32B 27/34; B32B 27/36; B32B 27/065; B32B 2435/00; B32B 2435/02; B32B 2307/748; B32B 2307/50; B32B 2307/54; B32B 2307/5825; B32B 15/04; B32B 15/08; B32B 15/20; B32B 5/18; B32B 2250/44; B32B 2266/025; B32B 2255/26; B32B 2581/00
  USPC ....... 220/359.1–359.4, 265, 258.2, 270, 255, 220/268; 215/232, 329, 341, 347, 215/349–350, 258, 261, DIG. 2; 229/123.1–123.2, 125.35, 164.1; 428/352, 344, 354, 349, 121, 189, 200, 428/35.7, 40.1, 906
  See application file for complete search history.

(56) References Cited

U.S. PATENT DOCUMENTS

| | | | | |
|---|---|---|---|---|
| 4,111,205 A * | 9/1978 | Nemeth | ................ | A61F 13/58 604/390 |
| 4,157,410 A * | 6/1979 | McClintock | ................ | C09J 7/22 428/40.6 |
| 4,596,338 A * | 6/1986 | Yousif | ................ | B65D 53/04 215/232 |
| 4,930,646 A * | 6/1990 | Emslander | ................ | B65D 41/045 215/232 |
| 4,960,216 A * | 10/1990 | Giles | ................ | B65D 51/20 215/232 |
| 5,004,111 A * | 4/1991 | McCarthy | ................ | B65D 51/20 215/232 |
| 5,182,156 A * | 1/1993 | Pape | ................ | A61F 13/58 428/130 |
| 5,197,618 A * | 3/1993 | Goth | ................ | B65D 51/20 206/484.2 |
| 5,423,441 A | 6/1995 | Conti | | |
| 5,514,442 A * | 5/1996 | Galda | ................ | B65D 51/20 215/232 |
| 5,702,015 A * | 12/1997 | Giles | ................ | B32B 37/26 215/232 |
| 5,860,544 A * | 1/1999 | Brucker | ................ | B65D 51/20 215/232 |
| 5,871,112 A * | 2/1999 | Giles | ................ | B32B 7/12 215/347 |
| 5,915,577 A * | 6/1999 | Levine | ................ | B65D 41/045 215/232 |
| 6,082,566 A * | 7/2000 | Yousif | ................ | B32B 15/08 215/232 |
| 6,974,045 B1 * | 12/2005 | Trombach | ................ | B65D 51/20 215/232 |
| 6,986,930 B2 * | 1/2006 | Giles | ................ | B65D 51/20 428/119 |
| 9,193,513 B2 * | 11/2015 | Thorstensen-Woll | ................ | B32B 5/18 |
| 9,533,805 B2 * | 1/2017 | McLean | ................ | B32B 15/08 |
| 2005/0208242 A1 * | 9/2005 | Smelko | ................ | B65D 51/20 428/35.7 |
| 2006/0054584 A1 | 3/2006 | Jackman | | |
| 2007/0003725 A1 * | 1/2007 | Yousif | ................ | B29C 66/1122 428/40.1 |
| 2010/0314278 A1 | 12/2010 | Fonteyne et al. | | |
| 2012/0048825 A1 | 3/2012 | Averrett | | |
| 2012/0070636 A1 * | 3/2012 | Thorstensen-Woll | ................ | B65D 77/2032 428/200 |
| 2012/0111758 A1 * | 5/2012 | Lo | ................ | B65D 51/22 206/524.6 |
| 2014/0186589 A1 * | 7/2014 | Chang | ................ | B32B 7/14 428/189 |
| 2014/0224800 A1 * | 8/2014 | Thorstensen-Woll | ................ | G03H 1/0244 220/255 |
| 2014/0284331 A1 * | 9/2014 | Thorstensen-Woll | ................ | B32B 27/16 220/258.2 |
| 2015/0232229 A1 * | 8/2015 | Thorstensen-Woll | ................ | B32B 5/22 220/270 |
| 2015/0321808 A1 * | 11/2015 | Thorstensen-Woll | ................ | B65D 55/026 215/232 |
| 2016/0159546 A1 * | 6/2016 | Cassidy | ................ | B26D 1/626 220/268 |
| 2018/0265261 A1 * | 9/2018 | Chang | ................ | B65D 53/04 |
| 2020/0079561 A1 * | 3/2020 | Zamora | ................ | B65D 65/40 |

OTHER PUBLICATIONS

Written Opinion from International Searching Authority for PCT/US2020/020480 from KIPO International Preliminary Examination Authority, dated Jun. 26, 2020 (5 pages).

* cited by examiner

USER-FRIENDLY TAMPER-RESISTANT/TAMPER-EVIDENT CONTAINER-SEAL SYSTEM FOR CONTAINERS OF CONSUMER GOODS AND METHODS OF USE

CROSS-REFERENCE TO RELATED APPLICATIONS

This patent application has common Inventorship with, and claims the priority benefit of, U.S. Patent Application No. 62/886,267, filed on Aug. 13, 2019 for "Improved User-Friendly Tamper-Resistant/Tamper-Evident Cap-Seal System for Containers of Consumer Goods and Methods of Use." Further, this patent application hereby incorporates by reference U.S. Patent Application No. 62/886,267 for all purposes. Should any irreconcilable conflicts arise between this patent application and the teachings of U.S. Patent Application No. 62/886,267 for purposes of claim construction/interpretation, then this patent application's teaching shall govern.

BACKGROUND

Containers of perishable and/or potentially hazardous consumer and commercial goods are commonly provided with tamper-resistant/tamper-evident seals to prevent inadvertent opening and to provide an indication to a user that a seal has already been breached. In typical containers of consumer and commercial goods (e.g., prescription medications), the tamper-resistant/tamper-evident container seal is often applied to the opening of a container using a removable or peelable seal, sealing member, or inner seal, with a cap or other closure then screwed or otherwise placed/attached over the container opening and encompassing the sealing member therein. In use, a consumer typically removes the cap or other closure to gain access to the sealing member and removes or otherwise peels the seal from the container in order to dispense or gain access to its contents. Initial attempts at sealing a container opening included an induction-type or conduction-type inner seal covering the container's opening where the seal is generally conformed to the shape of the opening (e.g., a circular container opening is sealed with a round disk approximately the same size and shape as the opening). These prior-art seals commonly have a lower heat-activated sealing layer to secure a periphery of the seal to a rim or other upper surface surrounding a container's opening. Upon exposing the seal to heat, the lower layer bonded to the container rim. In many cases, these seals included a foil layer capable of concentrating induction energy to activate the lower heat seal layer.

These prior-art seals tend to provide good sealing, but are often difficult to control in production, leading to little or no seal or to seals that are difficult for a consumer to remove because there is little or nothing for the consumer to grab onto in order to remove the seal. A typical type of container seal in the prior art includes a sealing member having a tab defined on the top of the seal. One common approach of these prior-art seals includes a partial layer coated with adhesive to secure the tab to a layer of metal foil. The tab is formed by a full layer extending across the entire surface of the sealing member, but the full layer is only bonded to part of the seal to form the tab. This type of top-tabbed seal offers a bit of a grasping area for the consumer to hold and peel off the seal. In other approaches, the seal may include a tab formed from the additional full layer of film combined with an additional full layer of adhesive utilizing a part paper or part polymer layer, called a tab stock, to form the tab. This part layer is inserted between the additional full layer of adhesive and lower seal portions to prevent the tab from sticking to the layers below, thus forming a small tab for a user to grip.

For solutions that include such very small, thin flexible tabs, some users, such as the elderly and/or those affirmed with arthritis in their hands, have a great deal of difficulty in accomplishing the task of gripping such small, thin, flexible tabs between their fingers and pulling-up with enough grip force to breach the container seal, before they lose their finger grip on the tab. Even if such users can eventually grip the very small, thin flexible tab, often the leverage available to the user is insufficient to easily open the container. One stop-gap solution is to reduce the induction or adhesive energy between the seal and the container in order to reduce the grip force required to open the container; however, this solution can result in poor-quality or incomplete sealing, leading to the contamination of the container contents and/or the lack of legally required tamper evidence.

There are other types of seals for containers used in the prior art, including those with a side tab or other flange that extends outwardly from a peripheral edge of the seal. These side tabs are generally not secured to the container and provide a grasping surface for a consumer to hold and peel off the seal. However, these side tabs extend over the side of the container rim and often protrude into a threaded portion of the closure. If the side tab is too large, this configuration may negatively affect the ability of the seal to form a good heat seal. The side tabs (and often the seal itself) can be deformed or wrinkled when the closure or other cap is placed on the container due to poor alignment between the closure (and threads thereof) and tabbed part of the seal. To minimize these concerns, such side tabs are often very small; thus, providing little surface area or material for a consumer to grasp in order to remove the seal.

What is needed is an improved means for elderly persons and those persons with medical conditions in their hands (e.g., limited finger-grip force and/or dexterity) that inhibit their ability to readily grip a small tab and open a sealed container.

BRIEF SUMMARY

The inventive disclosures described herein pertain to an improved tamper-resistant/tamper-evident (TE) seal for containers of consumer-product-containment vessels (such as, for example, prescription bottles, condiment bottles, etc.) that enables a user, and in particular older persons, to better grip and/or exert force/leverage to more-easily and reliably open such containers.

In one embodiment of the improved tamper-resistant seal, a typical prior-art seal configuration that features an inner seal with a small overlapping flexible pull-tab layer is improved by affixing a portion of the pull-tab to a portion of another substantially rigid upper layer such that a user can insert the pull-tab member between two of the user's fingers wherein the pull-tab member is disposed between the user's fingers and both the user fingers are below the substantially rigid upper layer such that a user can more easily exert pull force/leverage on the substantially rigid upper layer, reducing or eliminating the need for grip force between the fingers, in order to open the container that employs the tamper-resistant seal (see, e.g., FIG. 1E). This configuration is generally referred to as a "T-tab" configuration.

The foregoing Brief Summary is intended to merely provide a short, general overview of the inventive disclosure described throughout this patent application, and therefore, is not intended to limit the scope of the inventive disclosure contained throughout the balance of this patent application, including any appended claims and drawings.

BRIEF DESCRIPTION OF THE DRAWINGS

FIG. 1A depicts one embodiment of the side cross-sectional view of the layers/substrates used for an improved "T-tab" type tamper-resistant seal, showing typical prior-art substrates that would normally be disposed in a container cap and typical prior-art sealing substrates that are normally disposed at the very top of the container to be sealed, with the improved "T-tab" type tamper-resistant seal disposed in between.

FIG. 1C depicts one embodiment of the side cross-sectional view of the layers/substrates used for an improved "T-tab" type tamper-resistant seal, showing typical prior-art substrates disposed in a container cap installed on the container, and showing a typical prior-art sealing substrate disposed at the very top of the container, wherein the improved "T-tab" type tamper-resistant seal is shown disposed in between.

FIG. 2A depicts one alternate embodiment of the side cross-sectional view of the layers/substrates used for an improved "T-tab" type tamper-resistant seal, showing a temporary adhesive layer that is used in a container for engagements with the upper substrate of the improved seal, and showing a typical set of prior-art sealing substrates that are disposed at the very top of a container, wherein the improved "T-tab" type tamper-resistant seal is shown disposed in between.

DETAILED DESCRIPTION

I. Overview

Figure 1A:
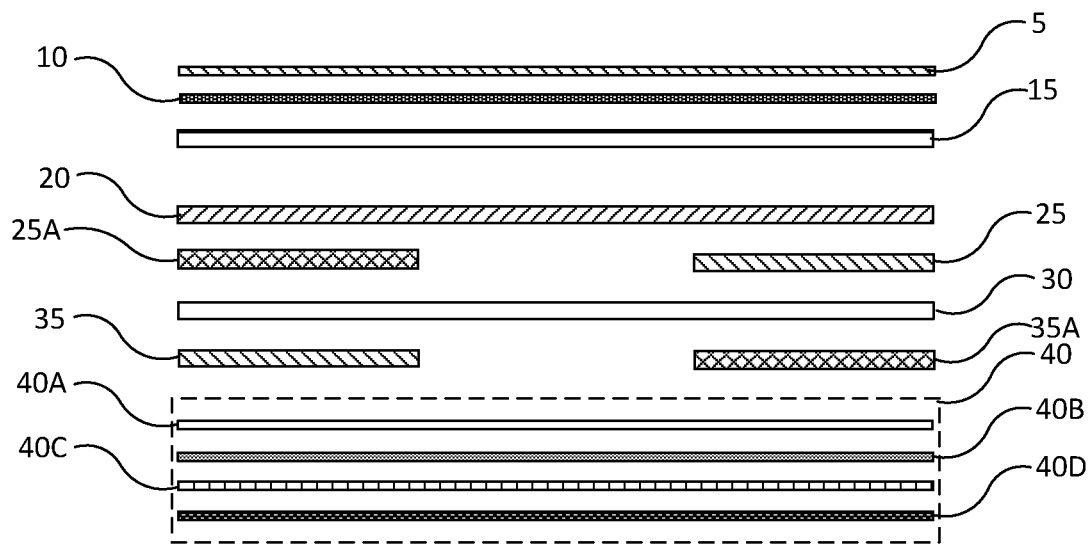
Figure 1B:
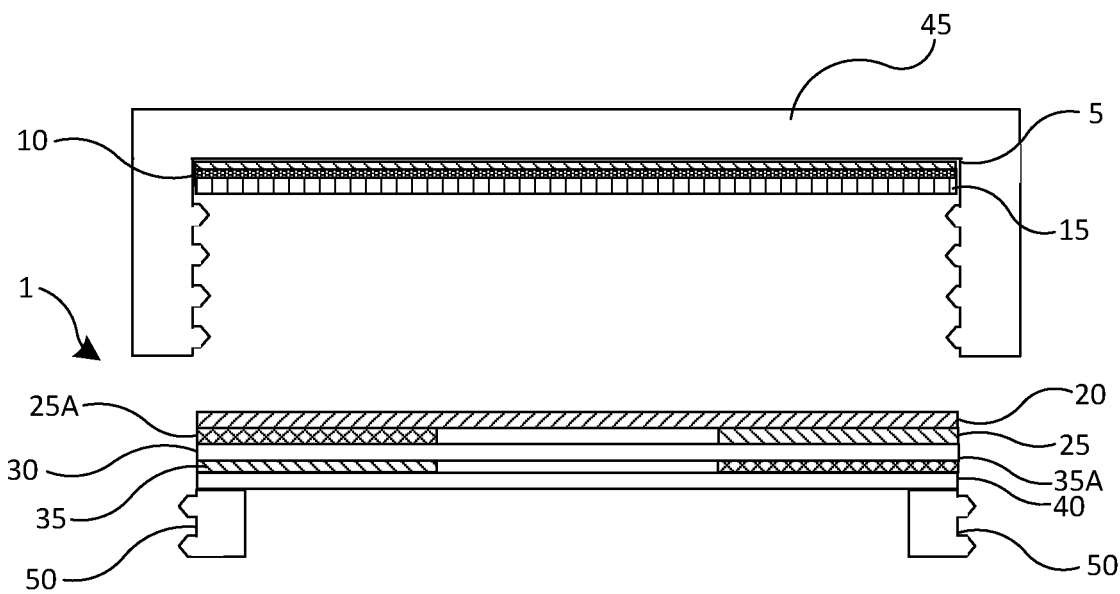
FIG. 1B depicts one embodiment of the side cross-sectional view of the layers/substrates used for an improved "T-tab" type tamper-resistant seal, showing typical prior-art substrates disposed in a container cap separated from the container, and showing a typical prior-art sealing substrate disposed at the very top of the container, wherein the improved "T-tab" type tamper-resistant seal is shown disposed in between in a compressed state.
Figure 1C:
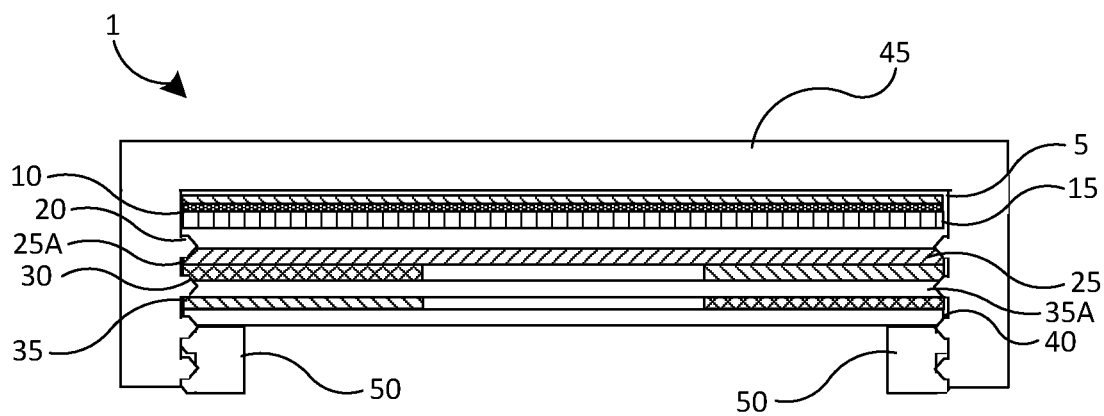

The inventive disclosures described herein pertain to an improved tamper-resistant/tamper-evident (TE) seal for containers of consumer-product-containment vessels (such as, for example, prescription bottles, condiment bottles, etc.) that enables a user, and in particular older persons, to better grip and/or exert force/leverage to more-easily and reliably open such containers. In one embodiment of the improved tamper-resistant seal, a typical prior-art seal configuration that features an inner seal with a small overlapping flexible pull-tab layer is improved by affixing a portion of the pull-tab to a portion of another substantially rigid upper layer such that a user can insert the pull-tab member between two of the user's fingers wherein the pull-tab member is disposed between the user's fingers and both the user fingers are below the substantially rigid upper layer such that a user can more easily exert pull force/leverage on the substantially rigid upper layer, reducing or eliminating the need for grip force between the fingers, in order to open the container that employs the tamper-resistant seal (see, e.g., FIG. 1E). This configuration is generally referred to as a "T-tab" configuration.

II. Terminology

The terms and phrases as indicated in quotes (" ") in this Section are intended to have the meaning ascribed to them in this Terminology Section applied to them throughout this document, including the claims, unless clearly indicated otherwise in context. Further, as applicable, the stated definitions are to apply, regardless of the word or phrase's case, to the singular and plural variations of the defined word or phrase.

The term "or", as used in this specification, drawings, and any appended claims, is not meant to be exclusive; rather, the term is inclusive, meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of the phrase "in one embodiment" and/or "in one variation" and similar phrases in various places in the specification are not necessarily all meant to refer to the same embodiment.

The term "couple" or "coupled", as used in this specification, drawings, and any appended claims, refers to either an indirect or a direct connection between the identified elements, components, or objects. Often, the manner of the coupling is related specifically to the manner in which the two coupled elements interact.

The term "removable", "removably coupled", "readily removable", "readily detachable", "detachably coupled", and similar terms, as used in this specification, drawings, and any appended claims, refer to structures that can be uncoupled from an adjoining structure with relative ease (i.e., non-destructively and without a complicated or time-consuming process) and that can also be readily reattached or coupled to the previously adjoining structure.

Directional and/or relational terms such as, but not limited to, left, right, nadir, apex, top, bottom, vertical, horizontal, back, front, lateral, proximal, and distal are relative to each other, are dependent on the specific orientation of an applicable element or article, are used accordingly to aid in the description of the various embodiments, and are not necessarily intended to be construed as limiting in this specification, drawings, and any appended claims.

As applicable, the terms "about", "approximately", or "generally", as used herein unless otherwise indicated, means a margin of +−20%. Also, as applicable, the term "substantially" as used herein unless otherwise indicated means a margin of +−10%. It is to be appreciated that not all uses of the above terms are quantifiable such that the referenced ranges can be applied.

III. An Improved User-Friendly Tamper-Resistant/Tamper-Evident Container-Seal System for Consumer Goods This Section III is directed generally to an improved tamper-resistant/tamper-evident (TE) seal for containers of consumer-product-containment vessels (such as, for example, prescription bottles, condiment bottles, etc.) that enables a user, and in particular older persons, to better grip and/or exert leverage to more-easily and reliably open such containers. Refer to FIGS. 1A through 4H.

In one embodiment of the improved tamper-resistant seal 1, a typical prior-art seal configuration 40 (including 40A, 40B, 40C, and 40D) (also referred herein as an "induction-layer, tamper-evident container seal," as an "inner seal," or as a "container seal") that features an inner seal with a small overlapping flexible pull-tab layer assembly 30, 35 is improved by affixing the pull-tab (also referred to as a flexible bottom sheet) 30 to another substantially rigid upper layer assembly 20, 25 such that a user can insert the flexible pull-tab member 30 between two of the user's fingers 55 wherein the two user fingers 55 are also disposed between the inner seal 40 and the substantially rigid upper layer 20 such that a user can more easily exert upward leverage/force to open the container that employs the improved tamper-resistant seal 1. This configuration is generally referred to as a "T-tab" configuration, because once fully extended to breach the seal, a "T" is somewhat formed when observed from the side that shows the user's fingertips 55 (see, e.g., FIG. 1E).

Referring to FIGS. 1A through 1E, in many embodiments, the overall seal system is comprised of the following layers/structures, some of which are typically found in the prior art, as described below:

First, the actual induction-layer, tamper-evident container seal 40 (already known in the art) that is intended to be breached to access the contained goods within the container 50 (with the container typically made of plastic, polypropylene, polyethylene, metal, or glass) typically, but not necessarily, comprises four substrates that include a non-foam heat-distribution sheet 40A (typically made from polyolefin materials such as polyethylene, polypropylene, or a blend thereof), an induction-heat-activated metal-foil layer 40B (typically made from aluminum foil, other metal foils, or metal-impregnated materials) with an optional adhesive layer (typically comprised of two-part polyurethane, ethylene vinyl acetate [EVA], or ethyl methactylate [EMA]), a lower polymer sheet/film 40C (typically made from polyester film, nylon, polyethylene naphthalate [PEN], and/or polypropylene), and a heat-activated adhesive sealant layer sheet 40D (typically made from EVA, ethylene-acrylic acid copolymer, or an ionomer resin such as, for example, Surlyn®). Of course, those skilled in the art will readily recognize that the composition of the container seal 40 can vary with other seal constructs known in the art without any effect on the inventive disclosures described herein.

Second, within the container cap 45 (typically made of plastic, polypropylene, polyethylene, or metal), and as is typical in the prior art, there is an upper composite layer typically comprised of (1) an upper cap-retention sheet (also called a cap liner and compressing layer) 10 (also generically referred to herein as a "cap-retention layer" or as a "container-cap layer," and typically made of fiber, pulp, chipboard, polymer, foam, or other compressible material), which in variations may be adhesively affixed to the container cap 45 (via an adhesive layer 5 typically being a of hot-melt, room-temperature-vulcanizing [RTV], or solvent-based adhesive), and/or affixed to/in the container cap 45 via interference fit; and (2) a heat-activated release layer 15 (also generically referred to herein as a "cap-retention layer" or as a "container-cap layer," and typically made from wax or other heat-activated release material) to further hold this assembly in place. In some prior-art applications, one or more additional support/protection layers (not shown) are also used with in the container cap 45, which are typically made from polyester film, nylon, polyethylene naphthalate (PEN), polypropylene, or other tear-resistant material, and those support/protection layers may be further supported with an adhesive layer (not shown) such as EVA or EMA and another bonding layer (not shown) typically made from paper, polyester film, nylon, PEN, and/or polypropylene. Of course, those skilled in the art will readily recognize that the container cap 45 and the composition of the cap-retention layers 5, 10, 15 can vary with other container caps and cap-retention layers known in the art without any effect on the inventive disclosures described herein.

Third, situated between the container-cap layers 5, 10, 15 and the actual container seal 40, is the improved seal-removal-tab assembly 20, 25, 30, 35. The improved seal-removal-tab assembly 20, 25, 30, 35 is comprised of a first adhesive layer 35 (also sometimes generically referred to herein as "adhesive" or "adhesive layer") disposed between the container seal 40 and at least one flexible bottom sheet 30 (in variations, this can have an added wax and retention disc), wherein the first adhesive layer 35 is disposed on one side of the flexible bottom sheet 30 and container seal 40, typically covering between a third and a half of the length of the container seal 40, such that when the flexible bottom sheet 30 is pulled upward, it can exert upward force on a portion of the container seal 40 so as to peel-away the container seal 40 and open the container 50. The main improvement on this tamper-resistant/tamper-evident container-seal-opening schema, and specifically the improved seal-removal-tab assembly 20, 25, 30, 35, is the addition of a semi-rigid (that is, stiff and solid, but still somewhat flexible) top sheet 20 that is adhesively coupled via a second adhesive layer 25 (also sometimes generically referred to herein as "adhesive coupling," "adhesive," or "adhesive layer") on the opposite side of the flexible bottom sheet 30 (relative to the first adhesive layer 35) and the adhesive coupling 25 preferably covering no more than a third of the length of the flexible bottom sheet 30, with the goal that when the improved seal-removal-tab assembly 20, 25, 30, 35 is fully extended, there is enough vertical space between the semi-rigid top sheet 20 and the flexible bottom sheet 30 for a user to fit his or her fingers about the vertical portion of the flexible bottom sheet 30. The semi-rigid top sheet 20 should be rigid enough to resist folding along its intersecting axis with the flexible bottom sheet 30 via the second adhesive layer 25. In some variations, the top sheet 20 can be fully rigid, though this is a less-preferred embodiment.

Figure 1D:
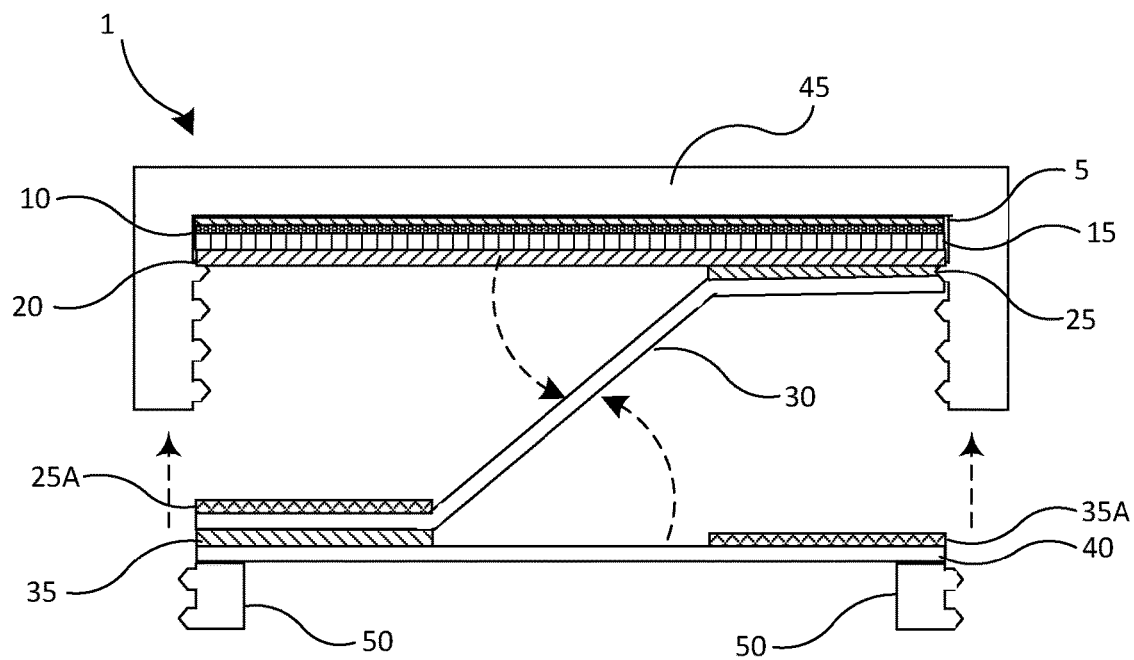
FIG. 1D depicts one embodiment of the side cross-sectional view of the layers/substrates used for an improved "T-tab" type tamper-resistant seal, showing typical prior-art substrates disposed in a container cap separated from the container, and showing a typical prior-art sealing substrate disposed at the very top of the container, wherein the improved "T-tab" type tamper-resistant seal is shown disposed in between while still attached to the cap and in a partially expanded state as the cap is removed from the container.
Figure 1E:
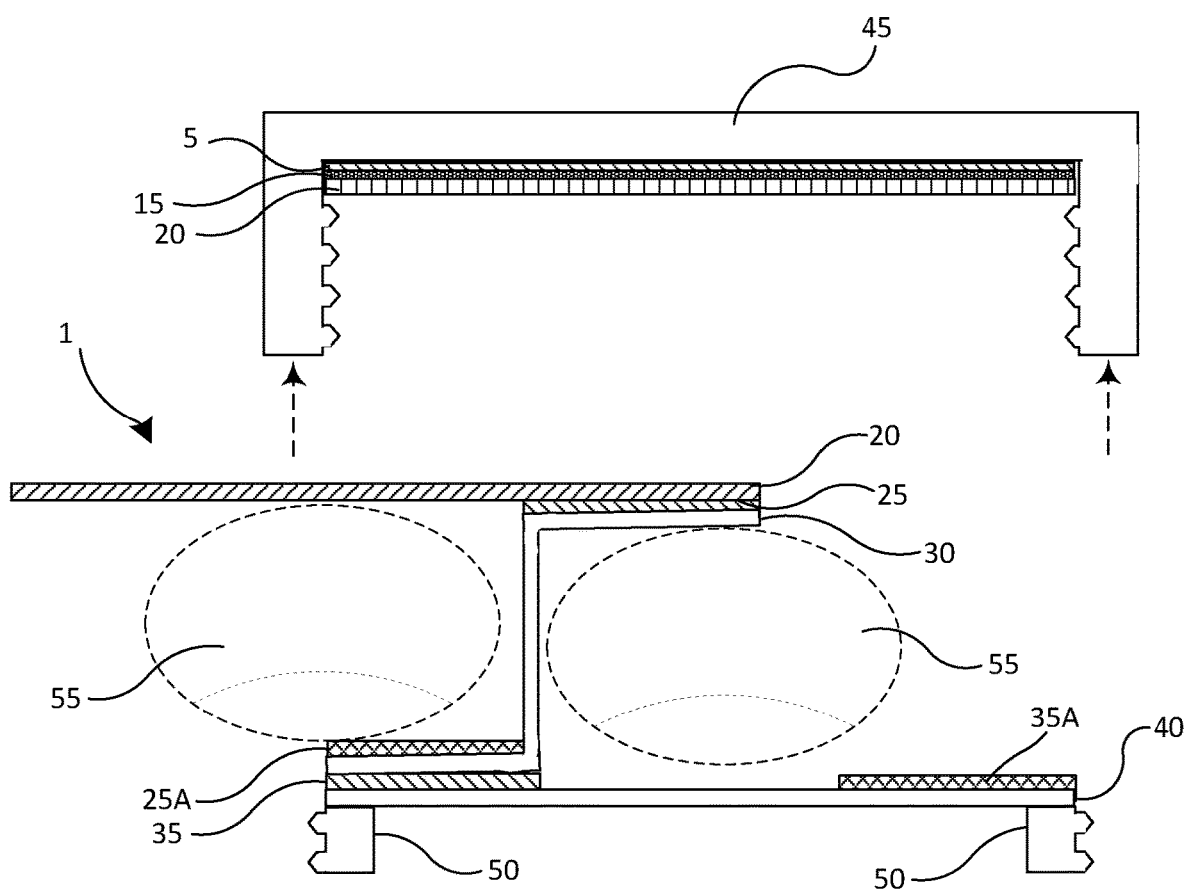
FIG. 1E depicts one embodiment of the side cross-sectional view of the layers/substrates used for an improved "T-tab" type tamper-resistant seal, showing typical prior-art substrates disposed in a container cap separated from the container, and showing a typical prior-art sealing substrate disposed at the very top of the container, wherein the improved "T-tab" type tamper-resistant seal is shown disposed in a completely expanded state while detached from the cap and being engaged by two user fingers so a user can exert upper force to detach the seal from the container.

To use the improved seal-removal-tab assembly 20, 25, 30, 35, the container cap/covering 45 is removed by a user to pull-up on the semi-rigid top sheet 20, which in many embodiments is detachably held within the container cap/cover 45 via an slight interference fit (though in variations, a low-strength adhesive can be used as well), in order to expand the seal-removal-tab assembly 20, 25, 30, 35 as shown in FIGS. 1D and 1E. Once the container cap/cover 45 is fully detached from the semi-rigid top sheet 20, a user can insert two of his or her fingers under the semi-rigid top sheet 20, which the flexible bottom sheet 30 disposed between the user's fingers, and pull upward to more-easily exert enough force to breach the container seal 40 and fully pull the container seal 40 off from the container 50. Alternatively, a user might opt to simply grasp the semi-rigid top layer 20 and pull-off the container seal 40.

In many variations, the adhesives 35, 25 used in the improved seal-removal-tab assembly 20, 25, 30, 35 are heat-activated polymer adhesives such as EVA or EMA. In more variations, the flexible bottom sheet 30 is typically comprised of a polymer material such as PET, polyester film, nylon, PEN, polypropylene, mylar, and/or other tear-resistant material. In still more variations, the semi-rigid top sheet 20 is typically comprised of a polymer material such as PET, polyester film, nylon, PEN, polypropylene, mylar, and/or other tear-resistant material.

In additional variations, an optional "release layer" of temporary adhesive can be applied somewhat adjacent next to each of the permanent adhesive layers 25, 35, in order to provide additional structural support and positioning (i.e., layer-to-layer registration) for the improved seal-removal-tab assembly 20, 25, 30, 35 during its fabrication (e.g., web-processing and die-cutting) and while it is in a compressed state. In such variations, when the semi-rigid top sheet 20 is extended when the container cap 45 is removed, the temporary-adhesive "release layers" 25A, 35A give way to allow the improved seal-removal-tab assembly 20, 25, 30, 35 to be fully extended by a user. In many cases, the temporary adhesive used is a "low-tack" type of adhesive, such as the class of adhesives known in the art as "fugitive adhesives." One such candidate temporary adhesive is "3M™ Hot Melt Adhesive 3798 LM," which is a low-melt adhesive that sticks quickly and removes easily, making it ideal for the purpose described above. Other similar low-tack adhesives known in the art can be used as well.

Figure 2A:
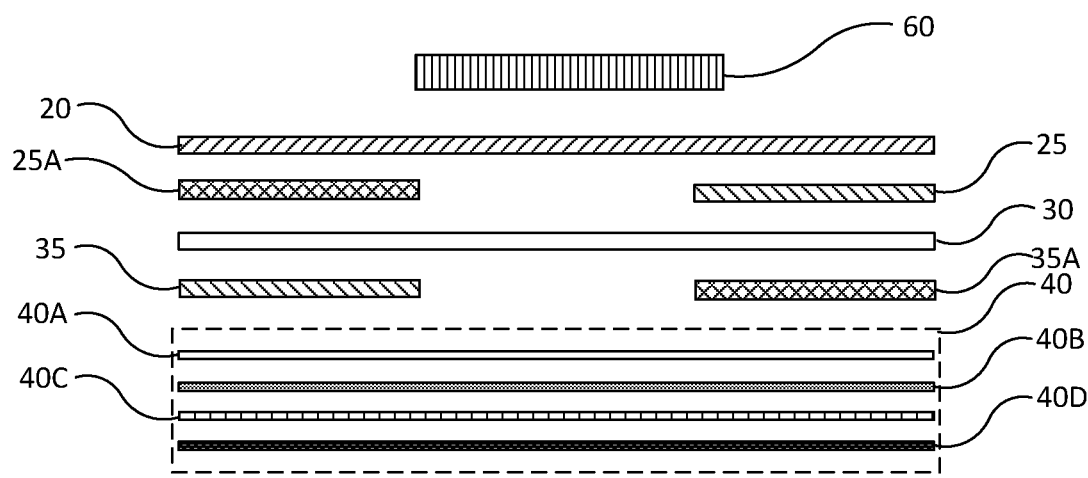
Figure 2B:
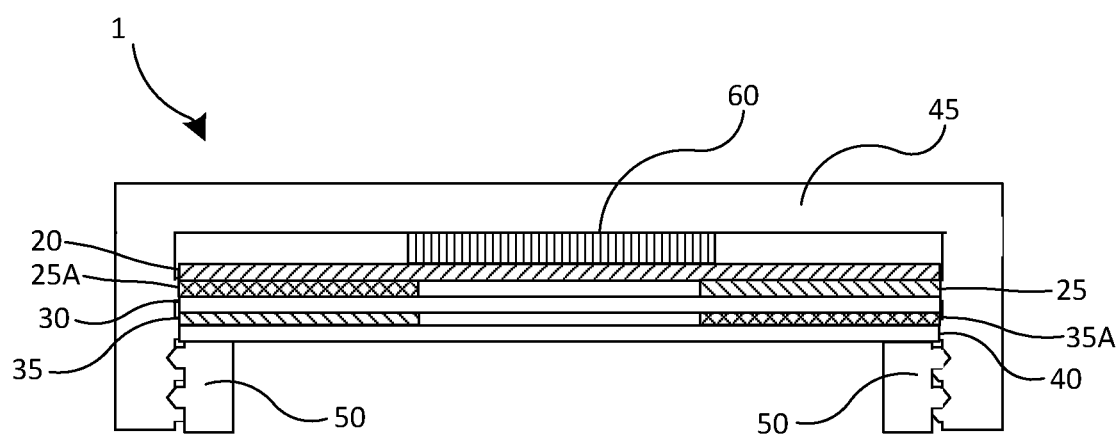
FIG. 2B depicts one embodiment of the side cross-sectional view of the layers/substrates used for an improved "T-tab" type tamper-resistant seal, showing a temporary adhesive layer in the container cap that is used to engage with the upper substrate of the improved seal, with the cap installed on the container and the temporary adhesive layer engaged with the upper substrate of the improved seal, and showing a typical prior-art sealing substrate disposed at the very top of the container, wherein the improved "T-tab" type tamper-resistant seal disposed in between is in a compressed state.

Referring to FIGS. 2A and 2B, in an alternative embodiment, the container cap 45 layers 5, 10, 15 shown in FIGS. 1A-1E are replaced by a layer of temporary adhesive 60, which provides a bonding between the container cap 45 and the semi-rigid top sheet 20. This temporary-adhesive layer 60 (also sometimes generically referred to herein as "adhesive bonding," temporary-adhesive bonding," or "adhesive") is typically a "low-tack" or "medium-tack" type of adhesive, such as the class of adhesives known in the art as "fugitive adhesives." One such candidate temporary adhesive is "3M™ Hot Melt Adhesive 3798 LM," which is a low-melt adhesive that sticks quickly and removes easily, making it ideal for the purpose described above. Other similar low-tack or medium-tack adhesives known in the art can be used as well. In still more variations, this temporary-adhesive layer 60 is a heat-activated polymer adhesive, such as EVA or EMA, or even wax. When a user opens the container 50 by removing the container cap 45, the adhesive bonding 60 is broken, exposing the semi-rigid top sheet 20 for a user to engage the improved seal-removal-tab assembly 20, 25, 30, 35 as previously discussed above in order to breach the container seal 40. The breaking/disturbance of this the temporary-adhesive bonding 60 (e.g., when a container cap 45 is unscrewed or otherwise removed from its container 50, as applicable) provides additional tamper evidence regardless of whether the actual container seal 40 is breached.

In variations, the temporary-adhesive layer 60 is made from a material having low torsional and low tensile strength. In such variations, the temporary-adhesive layer 60 bond between the container cap 45 and the semi-rigid top sheet 20 of the improved seal-removal-tab assembly 20, 25, 30, 35 is designed to fail as the cap is unscrewed or otherwise removed from its container 50, as applicable, and the container cap 45 is no longer bonded to the semi-rigid top sheet 20, allowing the container cap 45 to be removed and then the improved seal-removal-tab assembly 20, 25, 30, 35 to be deployed by a user.

Typically in this type of embodiment shown in FIGS. 2A and 2B, the entire improved seal-removal-tab assembly 20, 25, 30, 35 is die-cut and inserted into a container cap 45, and held in place by the adhesive 60 and/or a retention lip, is so equipped (see, e.g., component 65 in FIGS. 3A-3B), then the cap 45 is pressed or screwed onto its container 50, providing the correct force and position for induction or adhesive sealing of the entire improved seal-removal-tab assembly 20, 25, 30, 35 to the container 50. In more variations, though less preferred, a roll of the non-die-cut improved seal-removal-tab assembly 20, 25, 30, 35 is indexed over the container 50, heat staked and/or die-cut in one or two passes, and then the cap 45 is screwed or pressed on.

Figure 3A:
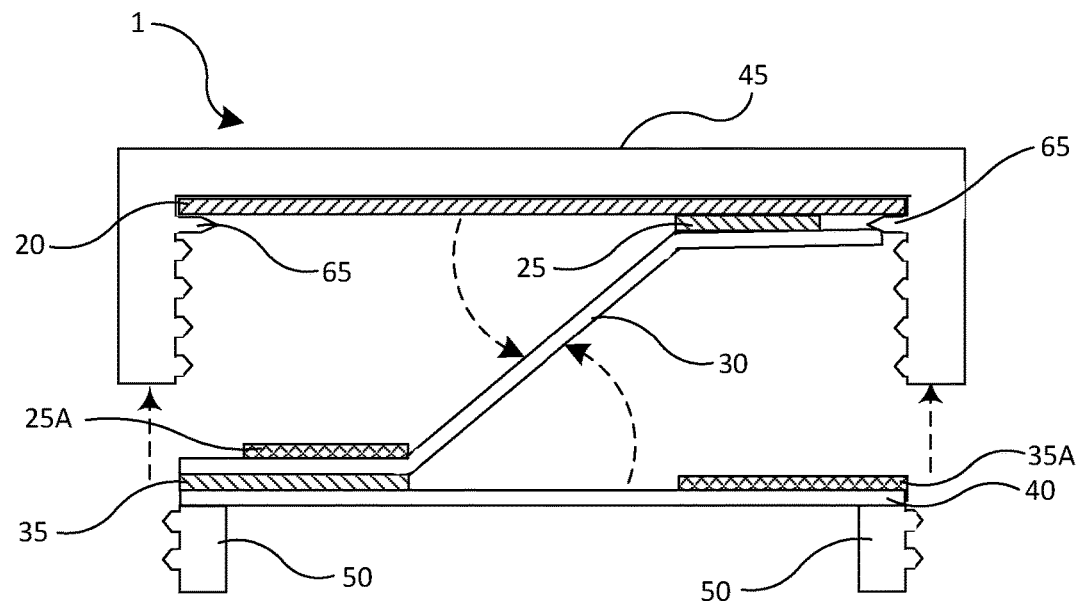
FIG. 3A depicts another alternate embodiment of the side cross-sectional view of the layers/substrates used for an improved "T-tab" type tamper-resistant seal in a partially expanded state, wherein the upper substrate of the improved seal is engaged with the container cap via an interference fit with an internal "lip" in the cap, with a typical prior-art sealing substrate disposed at the very top of the container, wherein the improved "T-tab" type tamper-resistant seal is shown disposed in between while still attached to the cap as the cap is removed from the container.
Figure 3B:
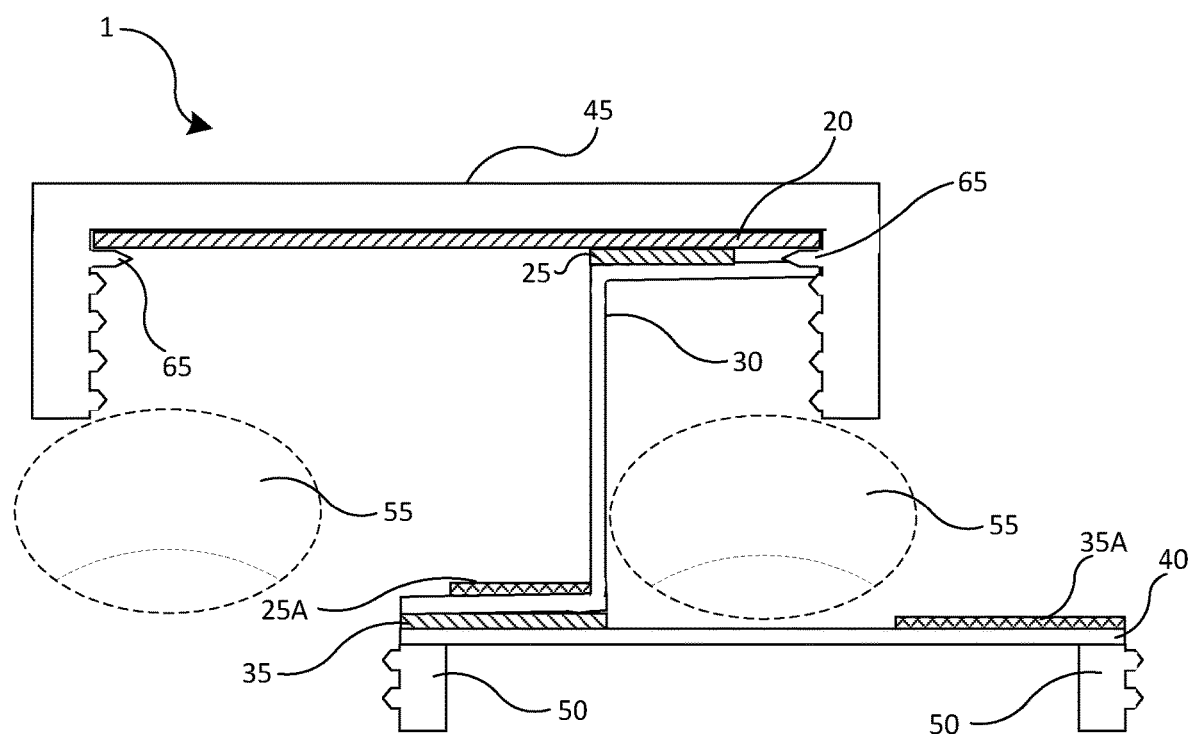
FIG. 3B depicts another alternate embodiment of the side cross-sectional view of the layers/substrates used for an improved "T-tab" type tamper-resistant seal in a completely expanded state, wherein the upper substrate of the improved seal is engaged with the container cap via an interference fit with an internal "lip" in the cap, with a typical prior-art sealing substrate disposed at the very top of the container, wherein the improved "T-tab" type tamper-resistant seal is shown disposed in between while still attached to the cap as the cap is removed from the container and being engaged by two user fingers so a user can exert upper force to detach the seal from the container.
Figure 4A:
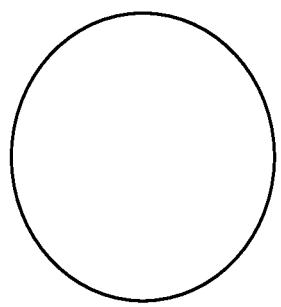
FIGS. 4A through 4H depict six example top-view container form factors (not all-inclusive) that can be used for the improved T-tab" type tamper-resistant seal described herein. In addition, these example top-view form factors can be used for the semi-rigid top sheet of the improved T-tab" type tamper-resistant seal irrespective of whether to top-view of the container is of the same shape so long as the semi-rigid top sheet is sized to be contained within the form factor of the top of the container.
Figure 4B:
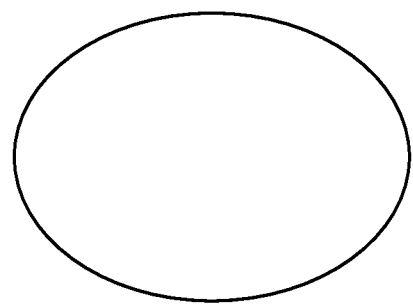
Figure 4C:
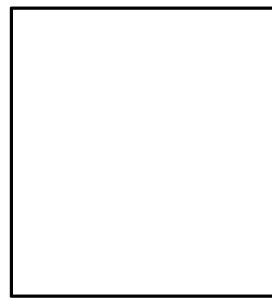
Figure 4D:
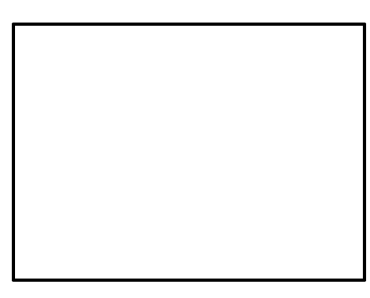
Figure 4E:
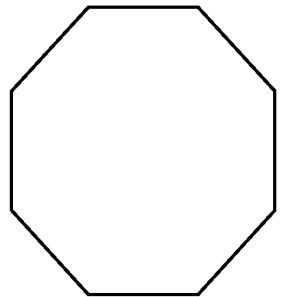
Figure 4F:
Figure 4G:
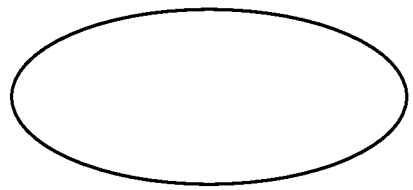
Figure 4H:

Referring to FIGS. 3A and 3B, in an alternative embodiment, the container cap 45 layers 5, 10, 15 shown in FIGS. 1A-1E are not present and instead, a retention lip/protrusion 65 (usually annular in nature) within the container cap 45 is used to hold in place the semi-rigid top sheet 20 within the container cap 45. In variations, there is enough clearance between the semi-rigid top sheet 20 and the container cap 45 and retention lip/protrusion 65 to allow the free rotation of the container cap 45 about the semi-rigid top sheet 20. When a user opens the container 50 by removing the container cap 45, the semi-rigid top sheet 20 is pulled up to extend improved seal-removal-tab assembly 20, 25, 30, 35 as previously discussed above in order to allow a user to breach the container seal 40 using his or her fingers about the flexible bottom sheet 30 and pulling-up on the container cap 45 that is engaged with the semi-rigid or rigid top sheet 20. Once the improved seal-removal-tab assembly 20, 25, 30, 35 is detached from the container 50, then it may be further detached from the container cap 45 and discarded.

Finally, it should be noted that, although the examples provided in FIGS. 1A through 3B are directed to very typical applications; that is, a threaded container cap 45 commonly found on a jar/bottle 50 holding consumer goods such as prescription medicines, the improved seal-removal-tab assembly 20, 25, 30, 35 as previously discussed above can be applied to just about any container of consumer goods of any shape, regardless of whether the container cap 45 is threaded or fits onto the container 50 via a snap-on lid, interference-fit lid, etc. In addition, those skilled in the art will readily recognize that the improved seal-removal-tab assembly 20, 25, 30, 35 is suitable for applications for container-opening form factors that are of various shapes; that is, not only circular in nature. See, for example, FIGS. 4A through 4H, which depict some potential form factors that could be used (but not an all-inclusive set of examples). Moreover, the shape of the semi-rigid top sheet 20 of the improved seal-removal-tab assembly 20, 25, 30, 35 does not necessarily have to be of the same shape as the flexible bottom sheet 30 or even the container seal 40 so long as the semi-rigid top sheet 20 is sized to allow a user's fingers to engage with the flexible bottom sheet 30 as previously described and that the flexible bottom sheet is affixed to one end of the container seal 40 such that a user can exert leverage to breach the container seal 40. Accordingly, all of the aforementioned applications of the use of the improved seal-removal-tab assembly 20, 25, 30, 35 are contemplated as part of the inventive disclosures herein.

IV. Alternative Embodiments and Other Variations

The various embodiments and variations thereof described herein, including the descriptions in any appended Claims and/or illustrated in the accompanying Figures, are merely exemplary and are not meant to limit the scope of the inventive disclosure. It should be appreciated that numerous variations of the invention have been contemplated as would be obvious to one of ordinary skill in the art with the benefit of this disclosure.

Hence, those ordinarily skilled in the art will have no difficulty devising myriad obvious variations and improvements to the invention, all of which are intended to be encompassed within the scope of the Description, Figures, and Claims herein.

What is claimed is:

1. An improved seal-removal-tab assembly for a container of consumer or commercial goods, said container having an induction-layer, tamper-evident container seal affixed over the opening of said container, comprising:
    a first adhesive layer adapted to be disposed on one end of said induction-layer, tamper-evident container seal, said first adhesive layer length being no more than one-half of the length of said induction-layer, tamper-evident container seal;
    at least one tear-resistant, flexible bottom sheet having a top side and a bottom side, with one end fixedly coupled to said first adhesive layer;
    a second adhesive layer fixedly coupled to said top side of said at least one tear-resistant, flexible bottom sheet on the end opposite of said coupling of first adhesive layer, said second adhesive layer length not being more than one-half of the length of said at least one flexible bottom sheet; and
    a top sheet, having a top side and a bottom side, fixedly coupled to said second adhesive layer, wherein:
        the length of said top sheet is approximately equal to the length of said at least one tear-resistant, flexible bottom sheet, and
        said top sheet is at least semi-rigid to resist folding along said top sheet's intersecting axis with said at least one tear-resistant, flexible bottom sheet via said second adhesive layer as a user exerts upward force with said user's fingers to cause said at least one tear-resistant, flexible bottom sheet to pull-on and breach said induction-layer, tamper-evident container seal affixed over the opening of said container.

2. The improved seal-removal-tab assembly of claim 1, wherein said top sheet is fully rigid.

3. The improved seal-removal-tab assembly of claim 1, wherein said first adhesive layer is a heat-activated polymer adhesive selected from the group consisting of EVA and EMA.

4. The improved seal-removal-tab assembly of claim 1, wherein said second adhesive layer is a heat-activated polymer adhesive selected from the group consisting of EVA and EMA.

5. The improved seal-removal-tab assembly of claim 1, wherein said at least one tear-resistant, flexible bottom sheet is substantially comprised of a polymer material selected from the group consisting of PET, polyester film, nylon, PEN, polypropylene, and mylar.

6. The improved seal-removal-tab assembly of claim 1, wherein said top sheet is substantially comprised of a polymer material selected from the group consisting of PET, polyester film, nylon, PEN, polypropylene, and mylar.

7. The improved seal-removal-tab assembly of claim 1, further comprising a first release layer of temporary adhesive disposed between said induction-layer, tamper-evident container seal and the bottom side of said at least one tear-resistant, flexible bottom sheet.

8. The improved seal-removal-tab assembly of claim 7, wherein said first release layer of temporary adhesive is fugitive adhesive.

9. The improved seal-removal-tab assembly of claim 1, further comprising a second release layer of temporary adhesive disposed between the top side of said at least one tear-resistant, flexible bottom sheet and the bottom side of said top sheet.

10. The improved seal-removal-tab assembly of claim 9, wherein said second release layer of temporary adhesive is fugitive adhesive.

11. The improved seal-removal-tab assembly of claim 1, further adapted to be fit within a container cap that is in turn adapted to cover both said improved seal-removal-tab assembly and said induction-layer, tamper-evident container seal.

12. The improved seal-removal-tab assembly of claim 11, wherein said top sheet is detachably coupled to the underside of said container cap via interference fit.

13. The improved seal-removal-tab assembly of claim 12, wherein said top sheet is adapted to be contained within a container cap that has a retention lip to contain said top sheet with enough clearance to allow said container cap to rotate independently of said top sheet.

14. The improved seal-removal-tab assembly of claim 11, wherein said top sheet is adapted to be detachably coupled to the underside of said container cap via a temporary adhesive layer.

15. The improved seal-removal-tab assembly of claim 14, wherein said temporary adhesive layer is selected from the group consisting of fugitive adhesives, heat-activated polymer adhesives, and wax.

16. The improved seal-removal-tab assembly of claim 1, wherein said improved seal-removal-tab assembly is adapted for use on a container of consumer or commercial goods selected from the group consisting of prescription medicine, vitamins, nutritional supplements, beverages, and foodstuffs.

17. The improved seal-removal-tab assembly of claim 1, wherein the top-view form factor of said improved seal-removal-tab assembly is selected from the group consisting of circle, oval, square, rectangle, rounded square, rounded rectangle, octagon, and other polygons.

18. An improved container of consumer or commercial goods, said container having an induction-layer, tamper-evident container seal affixed over the opening of said container, and having an improved seal-removal-tab assembly comprising:
  a first adhesive layer disposed on one end of said induction-layer, tamper-evident container seal, said first adhesive layer length being no more than one-half of the length of said induction-layer, tamper-evident container seal;
  at least one tear-resistant, flexible bottom sheet having a top side and a bottom side, with one end fixedly coupled to said first adhesive layer;
  a second adhesive layer fixedly coupled to said top side of said at least one tear-resistant, flexible bottom sheet on the end opposite of said coupling of first adhesive layer, said second adhesive layer length not being more than one-half of the length of said at least one tear-resistant, flexible bottom sheet; and
  a top sheet, having a top side and a bottom side, fixedly coupled to said second adhesive layer, wherein:
    the length of said top sheet is approximately equal to the length of said at least one tear-resistant, flexible bottom sheet, and
    said top sheet is at least semi-rigid to resist folding along said top sheet's intersecting axis with said at least one tear-resistant, flexible bottom sheet via said second adhesive layer as a user exerts upward force with said user's fingers to cause said at least one tear-resistant, flexible bottom sheet to pull-on and breach said induction-layer, tamper-evident container seal affixed over the opening of said container.

19. The improved container of consumer goods of claim 18, wherein said top sheet is fully rigid.

20. The improved container of consumer goods of claim 18, wherein said first adhesive layer is a heat-activated polymer adhesive selected from the group consisting of EVA and EMA.

21. The improved container of consumer goods of claim 18, wherein said second adhesive layer is a heat-activated polymer adhesive selected from the group consisting of EVA and EMA.

22. The improved container of consumer goods of claim 18, wherein said at least one tear-resistant, flexible bottom sheet is substantially comprised of a polymer material selected from the group consisting of PET, polyester film, nylon, PEN, polypropylene, and mylar.

23. The improved container of consumer goods of claim 18, wherein said top sheet is substantially comprised of a polymer material selected from the group consisting of PET, polyester film, nylon, PEN, polypropylene, and mylar.

24. The improved container of consumer goods of claim 18, further comprising a first release layer of temporary adhesive disposed between said induction-layer, tamper-evident container seal and the bottom side of said at least one tear-resistant, flexible bottom sheet.

25. The improved container of consumer goods of claim 24, wherein said first release layer of temporary adhesive is fugitive adhesive.

26. The improved container of consumer goods of claim 18, further comprising a second release layer of temporary adhesive disposed between the top side of said at least one tear-resistant, flexible bottom sheet and the bottom side of said top sheet.

27. The improved container of consumer goods of claim 26, wherein said second release layer of temporary adhesive is fugitive adhesive.

28. The improved container of consumer goods of claim 18, further comprising a container cap within which said improved seal-removal-tab assembly is adapted to be fit within said container cap.

29. The improved container of consumer goods of claim 28, wherein said top sheet is detachably coupled to the underside of said container cap via interference fit.

30. The improved container of consumer goods of claim 29, wherein said top sheet is adapted to be contained within said container cap that has a retention lip to contain said top sheet with enough clearance to allow said container cap to rotate independently of said top sheet.

31. The improved container of consumer goods of claim 28, wherein said top sheet is adapted to be detachably coupled to the underside of said container cap via a temporary adhesive layer.

32. The improved container of consumer goods of claim 31, wherein said temporary adhesive layer is selected from the group consisting of fugitive adhesives, heat-activated polymer adhesives, and wax.

33. The improved container of consumer or commercial goods of claim 18, wherein said improved container of consumer goods is adapted to contain goods selected from the group consisting of prescription medicine, vitamins, nutritional supplements, beverages, and foodstuffs.

34. The improved container of consumer goods of claim 18, wherein the top-view form factor of said improved seal-removal-tab assembly is selected from the group consisting of circle, oval, square, rectangle, rounded square, rounded rectangle, octagon, and other polygons.

35. The improved container of consumer goods of claim 18, wherein the top-view form factor of the opening of said improved container of consumer goods is selected from the group consisting of circle, oval, square, rectangle, rounded square, rounded rectangle, octagon, and other polygons.

* * * * *